(12) United States Patent
Kong

(10) Patent No.: US 9,907,124 B2
(45) Date of Patent: Feb. 27, 2018

(54) DEVICE FOR CURING ALIGNMENT FILM AND METHOD USING THE SAME

(71) Applicant: Beijing BOE Optoelectronics Technology Co., Ltd., Beijing (CN)

(72) Inventor: Deqian Kong, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 652 days.

(21) Appl. No.: 13/995,442

(22) PCT Filed: Nov. 16, 2012

(86) PCT No.: PCT/CN2012/084778
§ 371 (c)(1),
(2) Date: Jun. 18, 2013

(87) PCT Pub. No.: WO2014/008730
PCT Pub. Date: Jan. 16, 2014

(65) Prior Publication Data
US 2014/0076888 A1  Mar. 20, 2014

(30) Foreign Application Priority Data

Jul. 9, 2012 (CN) .......................... 2012 1 0236396

(51) Int. Cl.
| | |
|---|---|
| *H05B 6/68* | (2006.01) |
| *H05B 6/80* | (2006.01) |
| *G02F 1/13* | (2006.01) |
| *G02F 1/1337* | (2006.01) |

(52) U.S. Cl.
CPC ............. *H05B 6/80* (2013.01); *G02F 1/1303* (2013.01); *G02F 1/1337* (2013.01)

(58) Field of Classification Search
CPC ........ G02F 1/1303; G02F 1/1337; H05B 6/80
(Continued)

(56) References Cited

U.S. PATENT DOCUMENTS 4,314,126 A * 2/1982 Yoshimura ........... H05B 6/6482
219/685
4,409,453 A * 10/1983 Smith .................... A21B 1/245
219/400

(Continued)

FOREIGN PATENT DOCUMENTS

| CN | 1736128 A | 2/2006 |
|---|---|---|
| CN | 201846496 U | 5/2011 |

(Continued)

OTHER PUBLICATIONS

PCT International Preliminary Report on Patentability, dated Jan. 13, 2015; eight (8) pages.

(Continued)

*Primary Examiner* — Dana Ross
*Assistant Examiner* — Joseph Iskra
(74) *Attorney, Agent, or Firm* — Banner & Witcoff, Ltd.

(57) ABSTRACT

There is provided a device for curing an alignment film comprising a microwave heating chamber (1) and a microwave heating part (2) located within the microwave heating chamber (1); the microwave heating part (2) is used to perform microwave heating on the substrate (201) having alignment liquid to be cured located within the microwave heating chamber (1), until the alignment liquid to be cured is cured into an alignment film. Also, there is provided a method for curing an alignment film.

6 Claims, 1 Drawing Sheet

(58) Field of Classification Search
USPC ....... 219/678, 679, 702–712, 734, 719, 756, 219/759; 156/1, 60, 272.2, 275.5
See application file for complete search history.

(56) References Cited

U.S. PATENT DOCUMENTS

| | | | |
|---|---|---|---|
| 2006/0081626 | A1 | 4/2006 | Yoshino et al. |
| 2007/0206151 | A1* | 9/2007 | Sakai ................... G02F 1/1303 349/187 |
| 2014/0076888 | A1 | 3/2014 | Kong |

FOREIGN PATENT DOCUMENTS

| | | | |
|---|---|---|---|
| CN | 102355935 | A | 2/2012 |
| CN | 202189204 | * | 4/2012 |
| CN | 202189204 | U | 4/2012 |
| CN | 102778787 | A | 11/2012 |
| JP | 03264928 | A | 11/1991 |
| JP | 2001125107 | A | 5/2001 |
| WO | WO2011048349 | * | 4/2011 |

OTHER PUBLICATIONS

Third Office Action (Chinese language) issued by the State Intellectual Property Office ("SIPO") dated Mar. 13, 2015 for International Application No. 201210236396.0, 5 pages.
English translation of Third Office Action issued by SIPO on Mar. 13, 2015 for International Application No. 201210236396.0, 4 pages.
International Search Report (Chinese language) issued by the International Searching Authority, dated Jul. 9, 2012, 12 pages.
English abstract of CN202189204(U), 21 pages.
English abstract of JP2001125107(A), 9 pages.
English abstract of CN102355935(A), 42 pages.
English abstract of CN201846496(U), 13 pages.
English abstract of CN102778787(A), 10 pages.
First Office Action (Chinese language) issued by the State Intellectual Property Office ("SIPO") dated May 5, 2014 for International Application No. 201210236396.0, 7 pages.
English translation of First Office Action (Chinese language) issued by the State Intellectual Property Office ("SIPO") dated May 5, 2014 for International Application No. 201210236396.0, 5 pages.
English Language Abstract of JPH03264928A; 2 pages.
Second Office Action (Chinese language) issued by the State Intellectual Property Office ("SIPO") dated Oct. 10, 2014 for International Application No. 201210236396.0, 7 pages.
English translation of First Office Action (Chinese language) issued by the State Intellectual Property Office ("SIPO") dated Oct. 10, 2014 for International Application No. 201210236396.0, 6 pages.
English Language Abstract of CN202189204U; 2 pages.

* cited by examiner

DEVICE FOR CURING ALIGNMENT FILM AND METHOD USING THE SAME

CROSS REFERENCE TO RELATED APPLICATIONS

This application is based on International Application No. PCT/CN2012/084778 filed on Nov. 16, 2012, which claims priority to Chinese National Application No. 201210236396.0, filed on Jul. 9, 2012, the contents of which are incorporated herein by reference.

TECHNICAL FIELD

Embodiments of the present invention relate to a device for curing an alignment film and a method using the same.

BACKGROUND

In the process of manufacturing a thin film transistor liquid crystal display (TFT-LCD), its necessary to firstly applying a layer of alignment liquid (for example, polyimide (PI)) on the glass substrate used to form the liquid crystal cell, and after the alignment liquid is cured to form an alignment film and then rubbed in a certain direction, the liquid crystal molecule subsequently applied thereon can be aligned in a certain direction. Such substrates are then subjected to a cell-assembling process, a cutting process, etc. to achieve a liquid crystal display screen.

In a conventional TFT-LCD technology, the process of curing PI liquid, in particular the main curing stage of which, generally heats the PI liquid up to 200~300° C. to perform the curing process by heat conduction, and the curing time duration generally is between 20 and 30 min. Such a heat conduction manner needs a longer heating time period, and most part of the heat for heating dissipates into the environment, thereby causing higher energy consumption for heating, lower efficiency and relatively bad heating uniformity.

SUMMARY

Embodiments of the present invention provide a device for curing an alignment film and a method using the same, for improving efficiency of curing the alignment film.

An embodiment of the present invention provides a device for curing an alignment film, comprising: a microwave heating chamber and a microwave heating part located within the microwave heating chamber; the microwave heating part is used to perform microwave heating on the substrate having alignment liquid to be cured located within the microwave heating chamber, until the alignment liquid to be cured is cured into an alignment film.

An embodiment of the present invention provides a method for curing an alignment film using the above device for curing an alignment film, comprising: placing the substrate having alignment liquid to be cured in the device for curing an alignment film; and during a preset time period, microwave-heating the substrate having alignment liquid to be cured thereon with the device for curing an alignment film using microwave at a preset frequency and a preset output power, until the alignment liquid to be cured is cured into an alignment film.

As to the device for curing an alignment film and the method for using the same provided by the embodiments of the present invention, because the microwave heating increases the temperature of a heated body by making dipole molecules within the heated body reciprocate at a high frequency to produce "internal frictional heat", and the outer portion and the inner portion of the heated body can be heated at the same time and subjected to temperature rise without any thermal conduction process, which, compared with the existing manner for thermosetting alignment film by thermal conduction, enables curing of the alignment film uniformly in a shorter time period, improving the efficiency of curing of the alignment film; and heating on the alignment film by microwave heating can decrease energy consumption of curing process and thus save cost compared with a conventional heating manner through thermal conduction.

BRIEF DESCRIPTION OF THE DRAWINGS

In order to illustrate the technical solution of the embodiment of the present invention more clearly, a simply introduction about the drawings of the embodiments will be made in the following, and obviously, the drawings described later relate to only some embodiments of the present invention, rather than limitation to the present invention.

DETAILED DESCRIPTION

Figure 1:
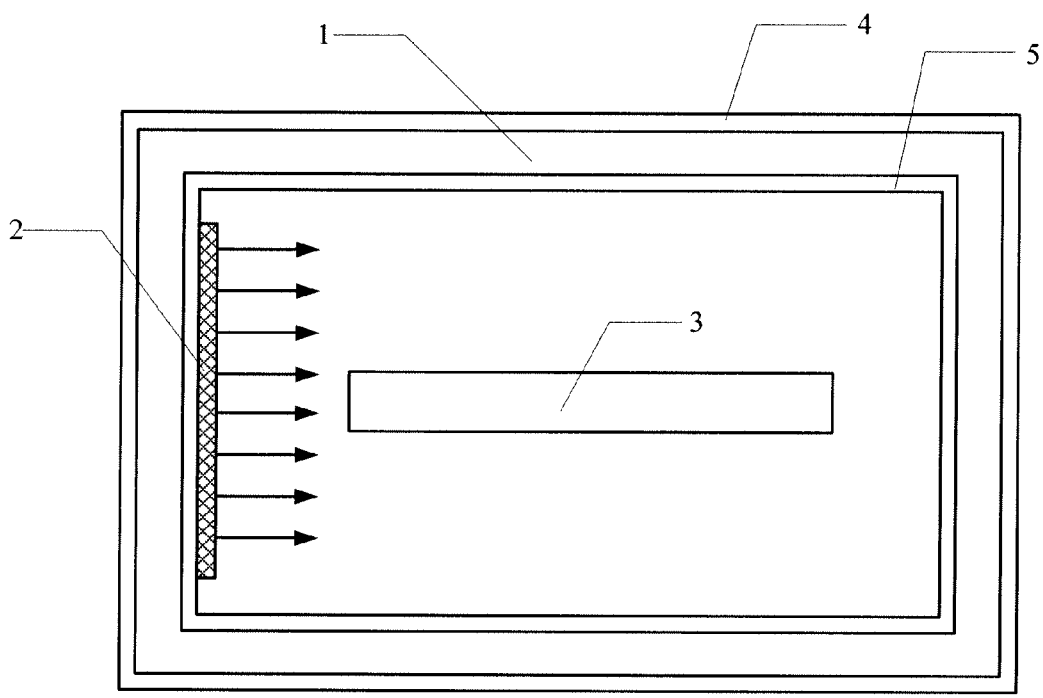
FIG. 1 is a structural schematic view of a device for curing an alignment film according to an embodiment of the present invention.

To make clearer the object, technical solutions and advantages of the embodiments of the present invention, a clear and full description of the technical solution of the embodiment of the present invention will be made with reference to the accompanying drawings of the embodiment of the present invention. Obviously, the described embodiments are merely part of the embodiments of the present invention, but not all the embodiments. Based on the described embodiments of the present invention, all the other embodiments acquired by the ordinary skilled in this art, without any creative labor, fall into the protective scope of the present invention.

Unless defined otherwise, the technical or scientific terminology used herein should take the meaning usually understood by those ordinary skilled in the related field of the present invention. The wordings "a", "an", "the" and the like do not represent quantitative limitation, but represent the existence of at least one. The term such as "comprise", "contain" or the like intends to indicate that the elements or articles before the term "comprise" or "contain" encompass the elements or articles and the equallent thereof listed after the term "comprise" or "contain", and does not exclude other elements or articles. "Connecting", "connected" or the like is not limited to physical or mechanical connection, but may comprise electrical connection regardless of being direct or indirect. Further, the wordings such as "upper", "lower", "left", "right" and the like are used only for describing a relative positional relationship, which will be varied correspondingly when the described objects are changed in its absolute position.

Description will be made with respect to certain specific examples of the device for curing an alignment film and the method using the same provided by the embodiments of the present invention in the following with reference to the drawings. In the drawings, sizes and shapes of various regions do not reflect actual scale of the device, but schematically illustrates content of the present invention only.

An embodiment of the present invention provides a device for curing an alignment film which, as shown in FIG. 1, comprises: a microwave heating chamber 1 and a microwave heating part 2 located within the microwave heating chamber 1.

The microwave heating part 2 is used to perform microwave heating on the substrate 3 having alignment liquid to be cured, which is located within the microwave heating chamber 1, until the alignment liquid to be cured is cured into an alignment film.

In one example, the microwave heating part 2 is of a plate configuration for example, and located on the inner side wall (as shown in FIG. 1), the top wall or the bottom surface, or on several walls of the microwave heating chamber 1. For example, the microwave heating part 2 specifically may be one or more microwave heating walls located within the microwave heating chamber, or a combination of several microwave heating plates. The embodiment of the present invention are not restricted in specific amount of microwave heating plates, as long as the microwave heating part 2 can emit microwave toward the substrate 3 placed within the microwave heating chamber. Usually, the area of the emitting surface of the microwave heating part 2 is not less than that of the heated object (i.e., alignment liquid to be cured) so as to ensure that all of the alignment liquid remains in the microwave field emitted from the microwave heating part 2 such that the alignment liquid is heated uniformly.

For example, when the microwave heating part 2 is located on the top wall or bottom surface of the microwave heating chamber 1, that is, the microwave heating part 2 being in a parallel relationship to the substrate 3 having alignment liquid to be cured thereon, the area of the emitting surface of the microwave heating part 2 is not less than that of the substrate 3 having alignment liquid to be cured thereon.

When the microwave heating part 2 is located on the inner side wall of the microwave heating chamber 1, that is, the microwave heating part 2 being in a orthogonal relationship with respect to the substrate 3 having alignment liquid to be cured thereon, the area of the emitting surface of the microwave heating part 2 is not less than that the side of the substrate 3 having alignment liquid to be cured thereon facing the microwave heating part 2.

In microwave heating, microwave emitted from the microwave heating part 2 increases the temperature of the heated body (i.e., alignment liquid to be cured) by making the dipole molecules within the heated body reciprocate at a high frequency to produce "internal frictional heat", and the outer portion and the inner portion of the heated body can be heated at the same time and subjected to temperature rise without any thermal conduction process. Only several seconds are necessary for the heated body to be heated up to normal heating temperature, that is 200~300° C., from room temperature. Since all portions of the alignment liquid are microwave heated in a synchronous and uniform way, only 5 seconds or so is needed to complete the main curing process, and the whole process generally lasts 15-25 seconds before the curing for the alignment film is completed. This extremely improves curing efficiency so that the cost is decreased, compared with the existing curing process for an alignment film by means of thermal conduction, for which 20-30 min is needed.

For example, the frequency of the microwave emitted from the microwave heating part 2 may be set to 4500±100 MHz; that is, the high frequency corresponds to the low dielectric constant of the alignment liquid, which can enable the microwave emitted from the microwave heating part 2 present a selective heating effect, i.e., heating is only performed on the alignment liquid, while there is essentially little temperature variation of the glass substrate during the whole curing process. In this way, the output power of the microwave heating part 2 may be, for example, only 75 KW-100 KW, and the energy consumption used for completing the curing process is only $\frac{1}{300} \sim \frac{1}{100}$ of the thermosetting by thermal conduction, it's possible to lower the energy consumption, save cost greatly, and of high economic value.

For example, the magnitude of the power of the microwave emitted from the microwave heating part 2 can be controlled directly so as to heat the alignment film up to an appropriate temperature, and this manner has no slow warming-up and cooling-down processes and can be more easily applied in automation and continuation production lines compared with the thermal conduction manner.

Preferably, to further depress energy consumption, the device for curing an alignment film provided by the embodiment of the present invention, as shown in FIG. 1, may further comprise: a first heat insulation layer 4 located on the outer wall of the microwave heating chamber 1 and/or a second heat insulation layer 5 located between the inner wall of the microwave heating chamber 1 and the microwave heating part 2, to depress heat loss during the curing process of the alignment film.

For example, the thickness of the first heat insulation layer 4 and the second heat insulation layer 5 may be 100 mm-300 mm, so that a better thermal insulation effect may be achieved.

In yet another example, for the convenience of continuous curing alignment liquid on several substrates so as to improve production efficiency, the device for curing an alignment film provided by the embodiment of the present invention may further comprise a substrate inlet and a substrate outlet located one two opposite sidewalls of the microwave heating chamber to facilitate passage of substrates in the device for curing an alignment film.

Furthermore, the embodiment of the present invention also provides a method for curing an alignment film using any of the above devices, and due to this method employs a similar principle to that of the device for curing an alignment film to resolve the corresponding technical problems, the implementation of this method may refer to the implementation of the devices, and the detailed description thereof are no longer repeated.

Figure 2:
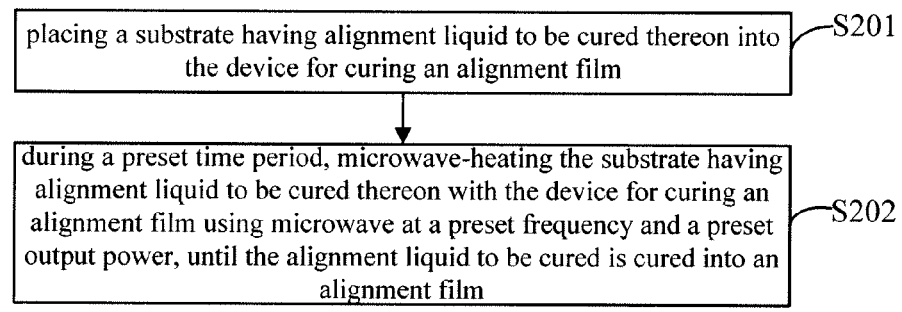
FIG. 2 is a flow chart of the method of curing an alignment film using the device for curing an alignment film according to an embodiment of the present invention.

The embodiment of the present invention provides a method for curing an alignment film using the device for curing an alignment film, as shown in FIG. 2, comprising the following steps:

S201: placing a substrate having alignment liquid to be cured thereon into the device for curing an alignment film; and S202: during a preset time period, microwave-heating the substrate having alignment liquid to be cured thereon with the device for curing an alignment film using microwave at a preset frequency and a preset output power, until the alignment liquid to be cured is cured into an alignment film.

For example, the preset time period is 15 s-25 s, the preset frequency is 4500±100 MHz, and the preset output power is 75 KW-100 KW.

The embodiment of the present invention provides a device for curing an alignment film and a method using the same, comprising a microwave heating chamber and a microwave heating part located within the microwave heating chamber; the microwave heating part is used to perform microwave heating on the substrate having alignment liquid to be cured thereon, which is located within the microwave heating chamber, until the alignment liquid to be cured is cured into an alignment film. As to the device for curing an alignment film and the method for using the same provided by the embodiments of the present invention, due to the microwave heating increases the temperature of the heated body by making the dipole molecules within the heated body reciprocate at a high frequency to produce "internal frictional heat', and the outer portion and the inner portion of the heated body can be heated at the same time and subjected to temperature rise without any thermal conduction process. The embodiment of the present invention, compared with the existing manner for thermosetting alignment film by thermal conduction, enables the curing of the alignment film uniformly in a shorter time period, improving the efficiency of curing the alignment film; and heating the alignment film by microwave heating can decrease energy consumption of curing process and thus save cost compared with conventional heating manner through thermal conduction.

The above described are solely exemplary embodiments of the present invention, rather than limitation on the protective scope of the present invention which is defined by the attached claims.

The invention claimed is:

1. A device for curing an alignment film, comprising:
    a microwave heating chamber; and
    a microwave heating part located within the microwave heating chamber,
    wherein the microwave heating part is used to perform microwave heating on a substrate having alignment liquid to be cured located within the microwave heating chamber, until the alignment liquid to be cured is cured into an alignment film, and
    wherein the microwave heating part is of a plate configuration and is located on an inner side wall of the microwave heating chamber, and the microwave heating part being in an orthogonal relationship with respect to the substrate having alignment liquid to be cured thereon;
    further comprising a first heat insulation layer and a second heat insulation layer, wherein, the first heat insulation layer is provided on an outer wall of the microwave heating chamber and the second heat insulation layer is provided between an inner wall and the microwave heating part in the microwave heating chamber; a thickness of the first heat insulation layer and the second heat insulation layer is from 100 mm to 300 mm;
    the first heat insulation layer is separated from the second heat insulation layer a predetermined distance with an air/essentially open space therebetween.

2. The device for curing an alignment film according to claim 1, wherein the area of an emitting surface of the microwave heating part is not less than the area of a side, opposite to the microwave heating part, of the substrate having the alignment liquid to be cured.

3. The device for curing an alignment film according to claim 1, wherein a frequency of microwave from the microwave heating part is 4500±100 MHz, and an output power of the microwave heating part is 75 KW-100 KW.

4. The device for curing an alignment film according to claim 1, further comprising a substrate inlet and a substrate outlet provided at two opposite sidewalls of the microwave heating chamber respectively.

5. A method for curing an alignment film using the device for curing an alignment film according to claim 1, comprising:
    placing a substrate having alignment liquid to be cured in the device for curing an alignment film; and
    during a preset time period, microwave-heating the substrate having alignment liquid to be cured with the device for curing an alignment film using microwave at a preset frequency and a preset output power, until the alignment liquid to be cured is cured into an alignment film.

6. The method according to claim 5, wherein the preset time period is 15 s-25 s, the preset frequency is 4500±100 MHz, and the preset output power is 75 KW-100 KW.

* * * * *